United States Patent
Dasylva et al.

(10) Patent No.: US 6,825,971 B1
(45) Date of Patent: Nov. 30, 2004

(54) TECHNIQUE AND APPARATUS FOR FREQUENCY CONVERSION IN AN OPTICAL NETWORK

(75) Inventors: Abel C. Dasylva, Ottawa (CA); Delfin Y. Montuno, Kanata (CA); Prasad Kodaypak, Nepean (CA); Pia Sindile, Ottawa (CA); Zhonghui Yao, Kanata (CA)

(73) Assignee: Nortel Networks Limited (CA)

( * ) Notice: Subject to any disclaimer, the term of this patent is extended or adjusted under 35 U.S.C. 154(b) by 184 days.

(21) Appl. No.: 10/325,978

(22) Filed: Dec. 23, 2002

(51) Int. Cl.$^7$ .............................. G02F 2/02; G02B 6/35
(52) U.S. Cl. ......................................... 359/326; 385/16
(58) Field of Search ............................... 359/326–332; 385/16, 17, 24

(56) References Cited

U.S. PATENT DOCUMENTS

| | | | |
|---|---|---|---|
| 5,825,517 A | 10/1998 | Antoniades et al. | ........... 398/50 |
| 6,710,913 B1 * | 3/2004 | Dasylva et al. | ............. 359/326 |
| 6,762,877 B1 * | 7/2004 | Dasylva et al. | ............. 359/332 |

OTHER PUBLICATIONS

Achille Pattavina, Switching Theory Architecture and Performance in Broadband ATM Networks, Sections 2.3.1, 3.2, and 4.2, John Wiley & Sons, 1998.
Byrav Ramamurthy, Wavelength Conversion in WDM Networking, IEEE Journal on Selected Areas in Communications, Sep. 1998, vol. 16., No. 7, pp. 1061–1073.
S. J. B. Yoo, Wavelength Conversion Technologies for WDM Network Applications, Journal of Lightwave Technology, Jun. 1996, vol. 14, No. 6, pp. 955–966.
N. Antoniades, An Architecture for a Wavelength–Interchanging Cross–Connect Utilizing Parametric Wavelength Coverters, Journal of Lightwave Technology, Jul. 1999, vol. 17, No. 7, pp. 1113–1125.
Dong–Jye Shyy, $Log_2$ (N,m,p) Strictly Nonblocking Networks, IEEE Transactions on Communications, Oct. 1991, vol. 39, No. 10, pp. 1502–1510.
Chin–Tau Lea, Tradeoff of Horizontal Decomposition Versus Vertical Stacking in Rearrangeable Nonblocking Networks, Jun. 1991, IEEE Transactions on Communications, vol. 39, No. 6, pp. 899–904.
W. Kabacinski, et al., Wide–Sense Non–blocking Multi–$Log_2$ N Broadcast Switching Networks, 2000 IEEE, pp. 1440–1444.
Chin–Tau Lea, Bipartite Graph Design Principle for Photonic Switching Systems, IEEE Transactions on Communications, Apr. 1990, vol. 38, No. 4, pp. 529–538.
M. H. Chou, et al., 1.5$\mu$m–band wavelength conversion based on difference–frequency generation in $LiNbO_3$ waveguides with integrated coupling structures, Optics Letters, Jul. 1, 1998, vol. 23, No. 13, pp. 1004–1006.

(List continued on next page.)

*Primary Examiner*—John D. Lee
(74) *Attorney, Agent, or Firm*—Hunton & Williams LLP

(57) ABSTRACT

A technique for wave-mixing bulk frequency conversion in a network comprising one or more channels is disclosed that enables cost-effective wavelength-conversion. In one particular exemplary embodiment, the technique may be realized by a new class of multi-log wave-mixing-cross-connects that are based on arbitrary b×b space-switching elements, where b>2. In such cross-connects, for any lightpath, the worst case number of cascaded frequency-conversions is $O(log_b(FW))$, F being the number of fibers. One benefit of the new design may be maximized when W=O(F), b=O(F), and the worst-case number of cascaded conversions is O(1).

10 Claims, 4 Drawing Sheets

OTHER PUBLICATIONS

M. H. Chou et al, Multiple–channel wavelength conversion by use of engineered quasi–phase–matching structures in LiNbO$_3$ waveguides, Optics Letters, Aug. 15, 1999, vol. 24, No. 16, pp. 1157–1159.

M.–S. Chou, et al., Optical frequency mixers for WDM and TDM applications, pp. 16–18, no journal name or date.

Kou–Chun Lee, et al., Optimization of a WDM Optical Packet Switch with Wavelength Converters[1], 1995 IEEE, pp. 423–430.

Chin–Tau Lea, Crossover Minimization in Directional–Coupler–Based Photonic Switching Systems, IEEE Transactions on Communications, Mar. 1988, vol. 36, No. 3, pp. 355–363.

F. K. Hwang, Choosing the Best log$k$(N, m, P) Strictly Nonblocking Networks, IEEE Transactions On Communications. vol. 46, No. 4, Apr. 1998, pp. 454–455.

A. Dasylva et al. B–ary Twisted Benes Networks, Nortel Networks, Feb. 26, 2002, pp. 1–4.

A. Dasylva et al, Log$b$(N, m, p) Wavelength–Interchanging Cross–Connects with Wave–Mixing Frequency–Translation, Nortel Networks, Sep. 12, 2002, pp. 1–5.

* cited by examiner

US 6,825,971 B1

TECHNIQUE AND APPARATUS FOR FREQUENCY CONVERSION IN AN OPTICAL NETWORK

FIELD OF THE INVENTION

The present invention relates generally to optical frequency conversion and, more particularly, to a technique for implementing wavelength-interchanging cross-connects with wave-mixing difference frequency generation devices.

BACKGROUND OF THE INVENTION

In metropolitan light-wave networks, wavelength-conversion enhances the network utilization, the connectivity, the flexibility, the ease of bandwidth management, and the reliability of network protection algorithms. Therefore wavelength conversion is an important feature of metropolitan optical networks. However, there is a need for dramatic reductions in the costs of wavelength-conversion technologies The cost of providing wavelength-conversion can be reduced through wave mixing bulk or band conversion, where many channels at distinct frequencies are simultaneously frequency-converted, in a common device. Two native forms of wave mixing are difference-frequency generation and four-wave mixing. For both forms of conversion, an incoming channel at frequency f is converted to an outgoing channel at frequency $(n-1)\pi-f$, where $\pi$ is the pump frequency, and n is the order of the wave-mixing process. We have n=2 for difference-frequency generation, and n=3 for four-wave-mixing.

With wave mixing, it is possible to build all-optical cross-connects providing non-blocking wavelength-conversion, with few converters. These architectures are multistage and comprise of many planes, and many stages of 2×2 space-switches.

A Twisted Benes architecture is based on a modification of the Benes architecture with wave-mixing converters providing difference-frequency generation. It is rearrangeable and uses O(FW) wave-mixing converters. In Twisted Benes networks, for any connection, the worst case number of cascaded frequency-conversions is $O(\log_2 W)$. Although it is based on bulk frequency-conversion, the Twisted Benes architecture has many limitations. First, it is only rearrangeable (i.e., some rerouting may be needed) at high load. Second, there is no cost-effective way to extend it with more planes into a strictly non-blocking network (e.g. into a Cantor network). Third, it does not offer any substantial reduction in the required number of wavelength-converters when compared to more conventional designs based on dedicated converters. Lastly, in Twisted Benes networks, for a given connection, the worst case number of cascaded frequency-conversions of $O(\log_2 W)$ is large.

Other architecture of wave-mixing cross-connects have been proposed. For example, architectures have been proposed that are based on wave-mixing frequency-translation instead of difference-frequency generation. The architecture enables the design of wave-mixing nodes with any multi-log topology, where converter requirements are between $O(\log_2 W)$ and $O(\log_2 W)$, per stage and per plane. With this architecture, it is possible to build strictly non-blocking networks with $O(F \log_2 W \log_2(FW))$ wave-mixing converters overall (using a Cantor topology), instead of O(FW) wavelength-converters. However like Twisted Benes networks, these networks may suffer from large impairments, due to the large worst-case number of cascaded frequency-conversions of $O(\log_2 W)$.

In view of the foregoing, it would be desirable to provide a technique for wave-mixing bulk frequency conversion which overcomes the above-described inadequacies and shortcomings. More particularly, it would be desirable to provide a technique for all-optical wavelength-conversion that uses difference-frequency generation in an efficient and cost effective manner.

SUMMARY OF THE INVENTION

According to the present invention, a technique for all-optical frequency-conversion based on wave mixing difference-frequency generation is provided. In one particular exemplary embodiment, the technique may be realized as a method for converting wavelength-channels in a network having a b×b space switch and a difference-frequency converter. The method may comprise selectively directing an incoming wavelength channel through the b×b space switch to the difference-frequency converter and converting the frequency of the incoming wavelength channel by pumping with a pump frequency of the form $2f_0 + \{(W-1) \pm db^i\}\Delta f$, wherein $d=0, 1, \ldots, b-1$, $f_0$ is a base frequency, W is the number of wavelengths, $\Delta f$ is a frequency spacing between adjacent channels, and $i=0, 1, \ldots, \log_b W-1$.

In accordance with other aspects of the invention, the technique may be realised by a method for selectively frequency translating channels in a system having W frequencies and one or more b×b space switching elements. The method may comprise selectively directing an incoming channel, operating at a respective one of the W frequencies and incoming in an incoming frequency order, based at least in part upon the respective frequency of the channel. The method may further comprise shifting the respective frequency of the selectively directed incoming channel by an amount defined by $\pm db^i \Delta f$, wherein $d=0, 1, \ldots, b-1$, $\Delta f$ is a frequency spacing between adjacent channels, and $i=0, 1, \ldots, \log_b W-1$ and converting the incoming frequency order to an outgoing frequency order such that outgoing frequency order is the inverse of the incoming frequency order.

In accordance with other aspects of this exemplary embodiment of the invention, wherein the incoming channel is a first channel and the selectively directed incoming channel is a first selectively directed channel, the method may further comprise selectively directing a second channel operating at another respective one of the W frequencies based at least in part upon the respective frequency of the second channel, wherein the respective frequency of the second selectively directed channel is the same as the respective frequency of the first selectively directed channel after it has been shifted.

In accordance with other aspects of the invention the technique may comprise a method for wave-mixing bulk frequency conversion in a network, wherein the network comprises one or more stages and one or more b×b switching elements connecting a number, F, of the incoming and outgoing waveguides and, wherein the incoming and outgoing frequencies correspond to a number of wavelengths W. The method may comprise selectively directing an incoming channel operating at a respective frequency $f_i$ of the incoming frequencies and incoming on a respective waveguide $x_j$ of the incoming waveguides to a respective outgoing waveguide $x_{j-d(b^s-1)}$ of the outgoing waveguides. The method may further comprise converting the respective frequency $f_i$ to a respective outgoing frequency $(f_0 + f_{W-1}) - f_i$, of the outgoing frequencies, wherein s is an index of a stage of the one or more stages, $i=0, \ldots, W-1$, $j=0, \ldots, F-1$, and $d=z_s-z_0$, where $z_{\phi-1} \ldots z_0$ is the b-ary representation of j and $\phi = \log_b F$.

In accordance with other aspects of the invention the technique may comprise a method for wave-mixing bulk frequency conversion in a network, wherein the network comprises one ore more stages and one or more b×b switching elements connecting a number, F, of the incoming and outgoing waveguides and, wherein the incoming and outgoing frequencies correspond to a number of wavelengths W. The method may further comprise selectively directing a respective one of the incoming channels operating at a respective frequency $f_i$ of the incoming frequencies and incoming on a respective waveguide $x_j$ of the incoming waveguides to a respective outgoing waveguide $x_{j+d}$ of the outgoing waveguides and, converting the respective frequency $f_i$ to a respective outgoing frequency $(f_0+f_{W-1}+db^{s-\phi}\Delta f)-f_i$, of the outgoing frequencies, wherein s is an index of a stage of the one or more stages, i=0, ..., W−1, j=0, ..., F−1, and d=$z_s$−$z_0$, where $z_{\phi-1}$ ... $z_0$ is the b-ary representation of j, $\phi=\log_b$ F and $\Delta f$ is a frequency spacing.

In accordance with other aspects of the invention an apparatus is provided for converting wavelength-channels in a network having a b×b space switch and a difference-frequency converter. The apparatus may comprise a b×b space switch that selectively directs an incoming wavelength channel to a difference-frequency converter that converts the frequency of the incoming wavelength channel by pumping with a pump frequency of the form $2f_0+\{(W-1)\pm db^i\}\Delta f$, wherein d=0, 1, ..., b−1, $f_0$ is a base frequency, w is the number of wavelengths, $\Delta f$ is a frequency spacing between adjacent channels, and i=0, 1, ... $\log_b$ W−1.

In accordance with other aspects of the invention an apparatus is provided for selectively frequency translating channels in a system having W frequencies and one or more b×b space switching elements. The apparatus may comprise one or more b×b space switching elements that selectively direct an incoming channel operating at a respective one of the W frequencies and incoming in an incoming frequency order, based at least in part upon the respective frequency of the channel. The apparatus may further comprise a frequency shifting device that shifts the respective frequency of the selectively directed incoming channel by an amount defined by $\pm db^i\Delta f$, wherein d=0, 1, ..., b−1, $\Delta f$ is a frequency, spacing between adjacent channels, and i=0, 1, ... $\log_b$ W−1. The apparatus may further comprise a frequency order converter that converts the incoming frequency order to an outgoing frequency order such that outgoing frequency order is the inverse of the incoming frequency order.

In accordance with other aspects of this exemplary embodiment, wherein the incoming channel is a first channel and the selectively directed incoming channel is a first selectively directed channel, the one or more b×b space switching elements may also selectively direct a second channel operating at another respective one of the W frequencies based at least in part upon the respective frequency of the second channel, wherein the respective frequency of the second selectively directed channel is the same as the respective frequency of the first selectively directed channel after it has been shifted.

In accordance with other aspects of the invention an apparatus is provided for wave-mixing bulk frequency conversion in a network, wherein the network comprises one or more stages and one or more b×b switching elements connecting a number, F, of the incoming and outgoing waveguides and, wherein the incoming and outgoing frequencies correspond to a number of wavelengths W. The apparatus may comprise one or more b×b switching elements that selectively direct an incoming channel operating at a respective frequency $f_i$ of the incoming frequencies and incoming on a respective waveguide $x_j$ of the incoming waveguides to a respective outgoing waveguide $x_{j-d(b^s-1)}$ of the outgoing waveguides and, a frequency converter that converts the respective frequency $f_i$ to a respective outgoing frequency $(f_0=f_{W-1})-f_i$, of the outgoing frequencies, wherein s is an index of a stage of the one or more stages, i=0, ..., W−1, j=0, ..., F−1, and d=$z_s$−$z_0$, where $z_{\phi-1}$ ... $z_0$ is the b-ary representation of j and $\phi=\log_b$ F.

In accordance with other aspects of the invention an apparatus for wave-mixing bulk frequency conversion in a network is provided, wherein the network comprises one ore more stages and one or more b×b switching elements connecting a number, F, of the incoming and outgoing waveguides and, wherein the incoming and outgoing frequencies correspond to a number of wavelengths W. The apparatus may comprise one or more b×b switching elements that selectively direct a respective one of the incoming channels operating at a respective frequency $f_i$ of the incoming frequencies and incoming on a respective waveguide $x_j$ of the incoming waveguides to a respective outgoing waveguide $X_{j+d}$ of the outgoing waveguides and, a frequency converter that converts the respective frequency $f_i$ to a respective outgoing frequency $(f_0+f_{W-1}+db^{s-\phi}\Delta f)-f_i$, of the outgoing frequencies, wherein s is an index of a stage of the one or more stages, i=0, ..., W−1, j=0, ..., F−1, and d=$z_s$−$z_0$, where $z_{\phi-1}$ ... $z_0$ is the b-ary representation of j, $\phi=\log_b$ F and $\Delta f$ is a frequency spacing.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

To begin, it is useful to assume an optical cross-connect with F fibers and W optical frequencies per fiber. The frequencies may be regularly spaced and of the form $f_i=f_0+i\Delta f$, where $f_0$ is the base frequency and $\Delta f$ is the frequency spacing. It is also useful to assume that for some integer $2 \leq b \leq F$, we have $F=b^\Phi$, and $W=b^\omega$.

Multi-log networks form an important class of multi-stage networks. These interconnection networks usually comprise of several identical planes, where each plane has many consecutive stages of switching elements, which are interconnected by specific patterns based on butterfly, shuffle or inverse-shuffle permutations. The characteristics of a multi-log network are usually given by an expression of the form $\log_b(N,m,p)$, where b denotes the size of the switching elements used to build the network, N is the size of the network (i.e. the number of inputs or outputs), m is the number of stages appended by horizontal extension, and p is the number of identical planes. A multi-log network of order b may be self-routing (SR), rearrangeably non-blocking (RNB) or strictly non-blocking (SNB), according to relations between the three parameters (N, m, and p) describing the network. These conditions are usually expressed by a required number of planes for a given level of non-blocking operation.

Wavelength-interchanging cross-connects are an example of multi-divisional switches. In such cross-connects, the assignment of channels to inlets and outlets is important.

In a wavelength division multiplexing (WDM) system, assume each fiber is labeled $x_j$ where $j=0,\ldots, F-1$, and each optical frequency is of the form $f_i=f_0+i\Delta f$, where $i=0,\ldots, W-1$. A given channel is denoted by a pair of the form $(f_i,x_j)$, where $f_i$ is the optical frequency of the channel and $x_j$ is its fiber (or dedicated optical wave-guide).

In some embodiments, a unique labeling of inlets, and outlets in a space-wavelength multi-log network may be implemented. For example, the labeling assigns channels to inlets and outlets in each stage as follows. In some stage s, it assigns the channel with frequency $$(-1)^s f_i + \frac{1}{2}[1 + (-1)^{s+1}](f_0 + f_{w-1})$$

from fiber $x_j$ to inlet or outlet $k=Fi+j$. Therefore, in an even stage, the inlet or outlet k is assigned frequency $f_i$, and for an odd stage the inlet or outlet k is assigned frequency $(f_0+f_{W-1})-f_i$.

In some stage s, assume that some inlet or outlet k with b-ary representation $k_{\phi+\omega-1}\ldots k_0$ is assigned the channel with frequency $f_i$ on fiber $x_j$. If s is even, $k_{\phi+\omega-1}\ldots k_\phi$ is the unsigned b-ary representation of i, and $k_{\phi-1}\ldots k_0$ is the unsigned b-ary representation of j. Otherwise $k_{\phi+\omega-1}\ldots k_\phi$ is the unsigned b-ary representation of (W−1)−i, and $k_{\phi-1}\ldots k_0$ is the unsigned b-ary representation of j.

Figure 1:
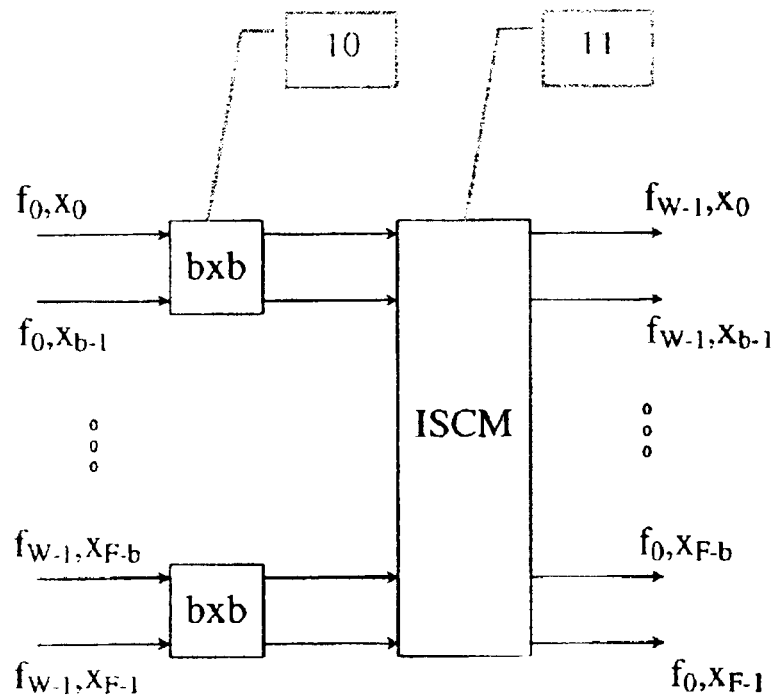
FIG. 1 is a schematic illustration of an even stage followed by an inter-stage connection module (ISCM), in a given plane in accordance with some embodiments of the invention.
Figure 2:
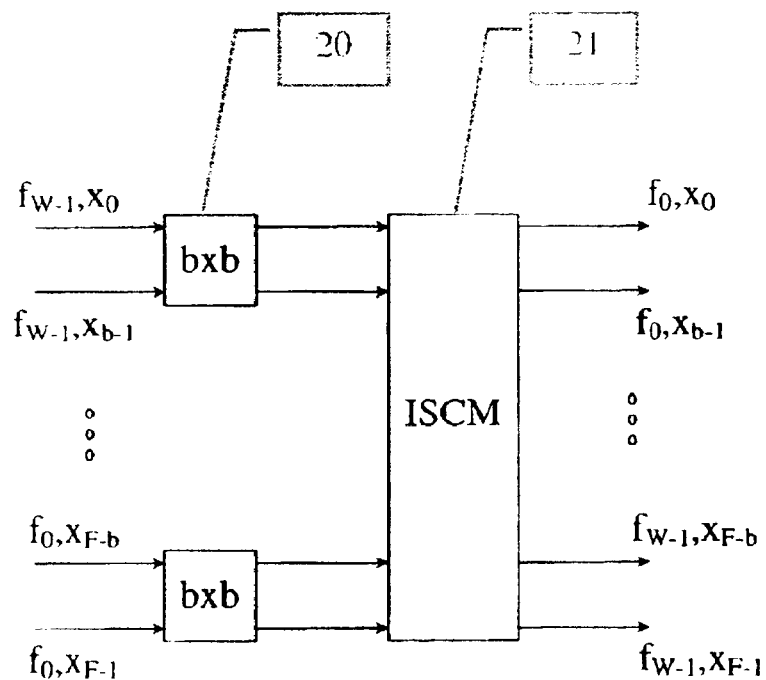
FIG. 2 is a schematic illustration of an odd stage, followed by an inter-stage connection module (ISCM), in a given plane in accordance with some embodiments of the invention.

FIG. 1 is a schematic representation of an even stage according to some embodiments of the invention. As shown, b×b space switching elements 10 connect to the following stage through an inter-stage connection module 11. The function of this latter module 11 is to provide basic inter-stage connection patterns including butterfly, shuffle and inverse-shuffle patterns. A similar description can be given for FIG. 2 representing an odd stage (elements 10 and 11 respectively map to elements 20 and 21).

In some embodiments, it is useful to denote by $y_{\omega-1}\ldots y_0 z_{\phi-1}\ldots z_0$ the binary representation of an inlet or outlet k. In an even stage, the inlet or outlet is assigned a channel with frequency $f_i$ on fiber $x_j$, where $y_{\omega-1}\ldots y_0$ is the b-ary representation of i and $z_{\phi-1}\ldots z_0$ is the b-ary representation of j. In an odd stage, the inlet or outlet is assigned a channel with frequency $(f_0+f_{W-1})-f_i$ on fiber $x_j$, where $y_{\omega-1}\ldots y_0$ is the b-ary representation of (W−1)−i and $z_{\phi-1}\ldots z_0$ is the b-ary representation of j.

A butterfly permutation $\beta_s$ of order b is defined as the mapping of an outlet from a given stage into an inlet of the next stage, where the b-ary representation of the next-stage inlet index is obtained by simply swapping the least significant digit, and the (s−1)-the least significant digit, in the b-ary representation of the index of the current-stage outlet.

For an even or an odd stage s, an arbitrary butterfly permutation $\beta_s$ (where $0<s \leq \phi+\omega-1$) can be implemented as follows.

If $s<\phi$: a channel with frequency $f_i$ incoming on fiber $x_j$ is converted to frequency $(f_0+f_{W-1})-f_i$, and then directed to fiber $x_{j-d(b^s-1)}$, where $d=z_s-z_0$.

If $\phi \leq s \leq \phi+\omega-1$: a channel with frequency $f_i$ incoming on fiber $x_j$ is directed to fiber $x_{j+d}$ and mapped to frequency $(f_0+f_{W-1}+db^{s-\phi}\Delta f)-f_i$, where $d=s_s-z_0$.

Figure 3:
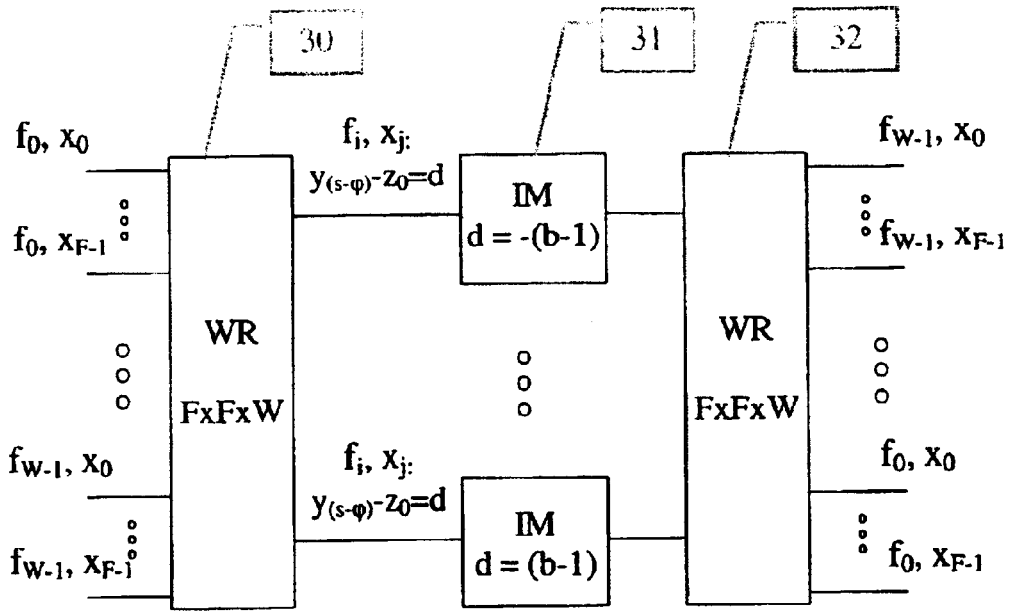
FIG. 3 is a schematic illustration of a b-th order space-wavelength Butterfly inter-stage connection module $\beta_s$ after an even stage for s≧$\phi$ according to some embodiments of the invention.
Figure 4:
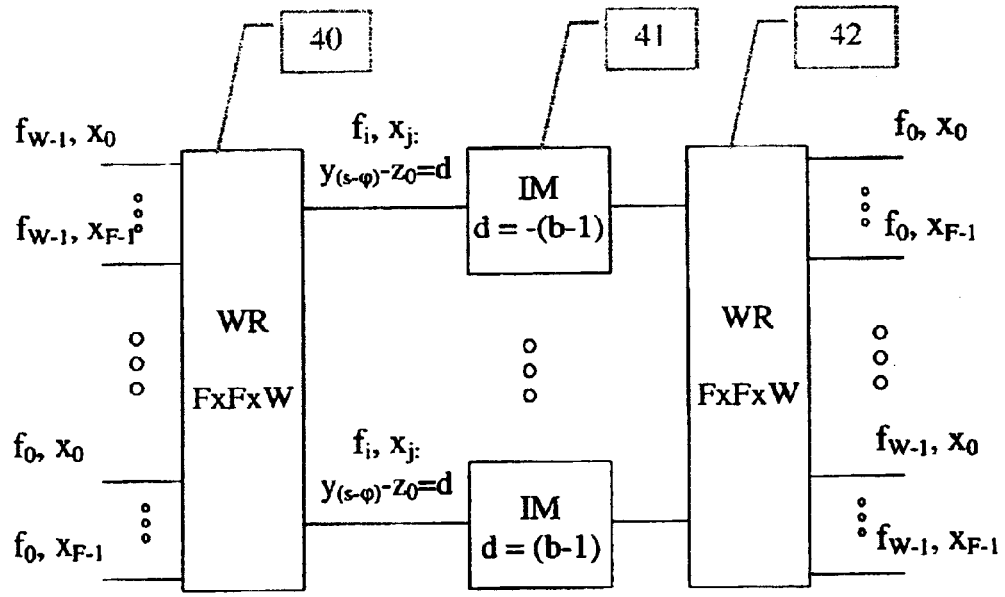
FIG. 4 is a schematic illustration of a b-th order space-wavelength Butterfly inter-stage connection module $\beta_s$ after an odd stage for s≧$\phi$ according to some embodiments of the invention.
Figure 5:
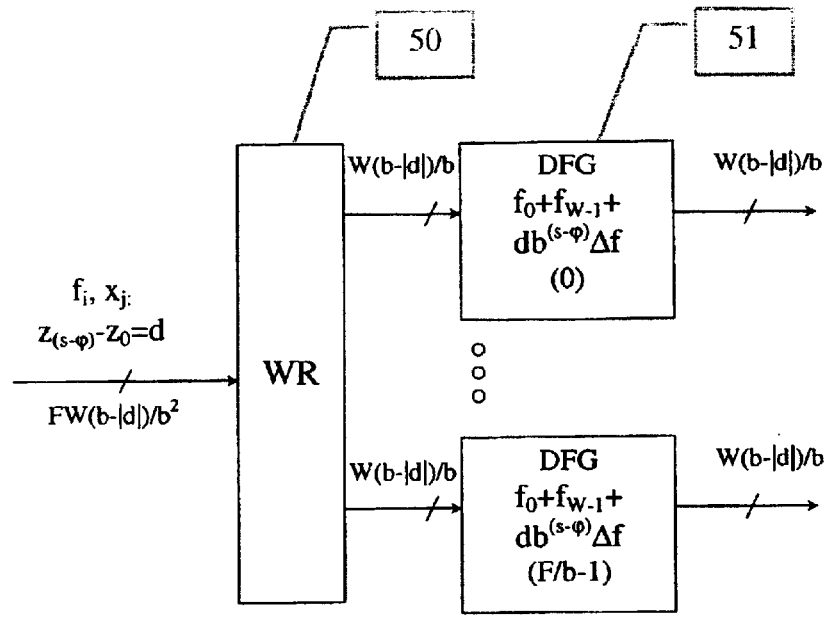
FIG. 5 is a schematic illustration of an intermediate module according to some embodiments of the invention.

The internal design of a b-th order butterfly inter-stage connection module is represented in FIG. 3 to FIG. 5. The internal architecture of a butterfly module $\beta_s$ depends on the value of s compared to $\phi$, where $\phi=\log_b F$.

FIG. 3 shows a butterfly module $\beta_s$, for an even stage $s \geq \phi$. In this case a static wavelength router directs incoming channels to one of (2b−1) intermediate modules 31, where each intermediate module takes $FW(b-|d|)/b^2$ inputs of the form $(f_i,x_j)$, where $y_{s-\phi}-z_0=d$, and $-(b-1) \leq d \leq (b-1)$ is characteristic of the intermediate module. From the intermediate modules the wavelength-channels are directed to a second wavelength-router 32, and to inlets of next stage switching elements. In the first wavelength-router 30, channels are directed to an intermediate module 31 according to $y_{s-\phi}\ldots z_0$ (i.e., according to the frequency and to the fiber of the channel at the input of the butterfly inter-stage connection module). At the outputs, an intermediate module preserves the information about the fibers of the channels at the input of the inter-stage connection module. In other words, the output taken by a given channel at the output of the intermediate module uniquely maps to the fiber assigned to the channel at the input of the inter-stage connection module. In the second wavelength-router 32, an incoming channel is wavelength-routed to fiber $x_{j+d}$, where j is the index of the fiber assigned to the channel at the input of the inter-stage connection module, and d is characteristic of the intermediate module of the channel.

A similar description can be given for FIG. 4, where elements 40, 41 and 42 respectively correspond to elements 30, 31 and 32 in FIG. 3.

FIG. 5 shows the internal design of an intermediate module (IM). A total of $FW(b-|d|)/b^2$ wavelength-channels are sent to a given intermediate module. They all satisfy a relation of the form $y_{s-\phi}-z_0=d$, where d is a constant for a given intermediate module $(-(b-1) \leq d \leq (b-1))$. Within an intermediate module, the channels are first directed to a first wavelength-router 50 that groups the channels into F/b distinct groups of $W(b-|d|)/b$ channels at one of $W(b-|d|)/b$ distinct optical frequencies (i.e., channels in the same group have the same frequency). At the output of the wavelength-router 50, all channels within a given group are directed to one of F/b wave-mixing converters 51, which provides a difference-frequency conversion with pump frequency $f_0+f_{W-1}+db^{s-\phi}\Delta f$ and then directs the channels to outputs of the intermediate module. Note that when d=0, no frequency-translation is needed, and therefore neither the wavelength-router 50 nor the frequency-translation modules 51 are required.

When $s<\phi$, the butterfly inter-stage connection is simply provided by a static wavelength-router that directs channels as follows.

If $z_s=z_0$, channel $(f_i,x_j)$ is switched to $(f_0+f_{W-1}-f_i,x_j)$. Otherwise channel $(f_i,x_j)$ is switched to channel $(f_0+f_{W-1}-f_i,x_{j-(b^s-1)(z_s-z_0)})$.

Figure 6:
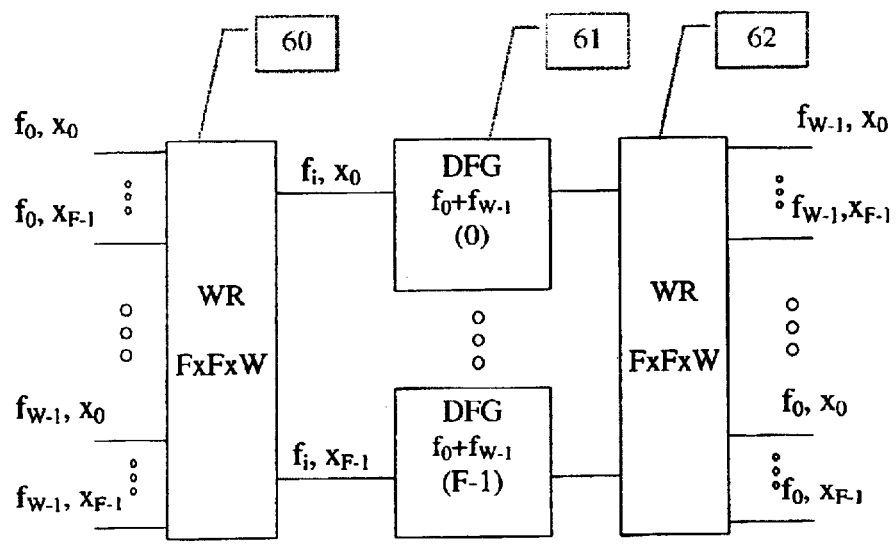
FIG. 6 is a schematic illustration of a b-th order space-wavelength Butterfly inter-stage connection module $\beta_s$ after an even stage for s<$\phi$ according to some embodiments of the invention.

FIG. 6 shows a butterfly module $\beta_s$, for an even stage $s<\phi$. In this case a static wavelength router 60 directs incoming channels to one of F difference-frequency converters 61, where each converter takes W input channels at distinct frequencies. For example, channels can be grouped by fibers into the wavelength-converters. In the difference frequency-converters 61, channels are converted by a difference-frequency operation with pump frequency $f_0+f_{W-1}$. From the difference-frequency converters, the channels are directed to a second wavelength-router 62, and to inlets of next stage switching elements. In the second wavelength-router 62, an incoming channel is wavelength-routed to fiber $x_{j-d(b^s-1)}$, where j is the index of the fiber assigned to the channel at the input of the inter-stage connection module, and d is characteristic of the channel (for each channel, $d=z_s-z_0$ is computed at the input of the inter-stage connection module).

Figure 7:
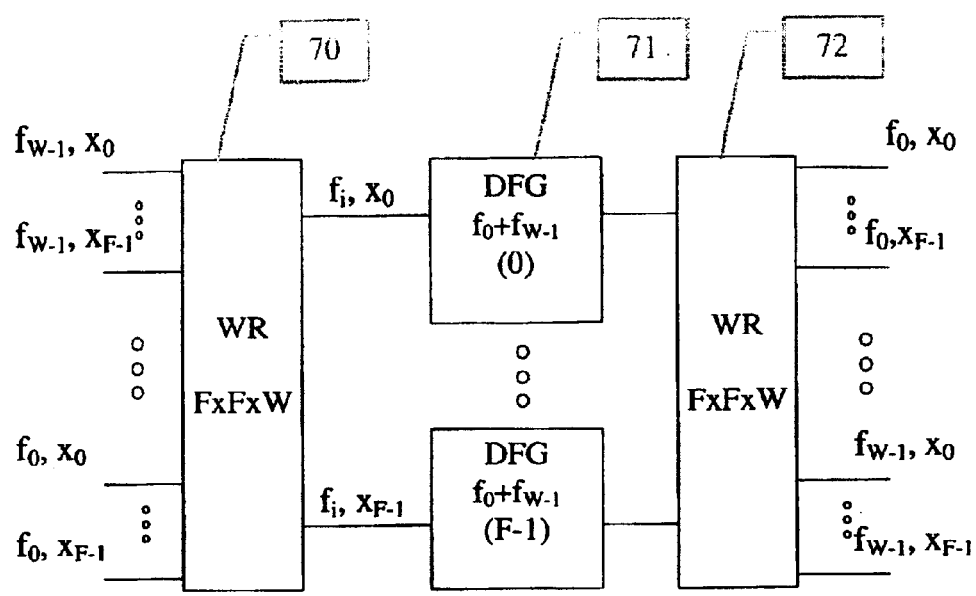
FIG. 7 is a schematic illustration of a b-th order space-wavelength Butterfly inter-stage connection module $\beta_s$ after an odd stage for $s<\phi$ according to some embodiments of the invention.

A similar description can be given for FIG. 7 representing the inter-stage connection module of an odd stage $s<\phi$ (elements 70, 71 and 72, respectively correspond to elements 60, 61 and 62 in FIG. 6).

When $0<s<\phi$, a b-th order butterfly permutation requires F wave-mixing converters. When $\phi \leq s \leq \phi+\omega-1$, the inter-stage connection module contains (2b-2) wavelength-converting intermediate modules, each with F/b wave-mixing converters. Therefore an inter-stage connection module requires 2F(b-1)/b (i.e. O(F)) bulk wave-mixing converters, when $\phi \leq s \leq \phi+\omega-1$. Overall a butterfly inter-stage module requires O(F) wave-mixing converters.

In each butterfly permutation a given channel is converted at most once. Therefore, the worst-case number of frequency-conversions affecting a given channel is O(1).

Shuffles and inverse shuffles are also key permutations for the construction of multi-log networks. Like butterfly permutations, they can be easily described in terms of digit permutations on the b-ary representation of inlets and outlets. For a given $0<h \leq \phi+\omega-1$, the shuffle $\sigma_h$ does a left-to-right circular permutation of the h+1 least significant digits of the b-ary representation of outlets. The inverse shuffle $\sigma^{-1}_h$ does a right-to-left circular permutation of the h+1 least significant digits of the b-ary representation of outlets.

Some embodiments of the invention may comprise a shuffle or inverse shuffle inter-stage connection with O(F $\log_b$ W) wave-mixing frequency-converters, by using a statically configured and rearrangeable $\log_b(FW,\phi+w-1,1)$ network, which is based on butterfly permutations implemented as described in previous paragraphs. This $\log_b(FW,\phi+w-1,1)$ is in fact a horizontally extended version of the Banyan topology, where the worst-case number of cascaded frequency-conversion is $2 \log_b(FW)-1$. With this technique the worst-case converter complexity of a shuffle or inverse-shuffle permutation is $O(F \log_b(FW))$, while for any connection, the number of cascaded frequency-conversions is at most $O(\log_b(FW))$.

The architecture described in FIG. 1 can also support multicast connections, when the b×b switching elements have multicast capabilities. However, no change is required regarding inter-stage connection modules (ISCMs).

As discussed herein, simple construction of multi-log wavelength-interchanging cross-connects with arbitrary b×b space-switches, where $2 \leq b \leq F$ is implemented. The invention exploits bulk wave-mixing difference-frequency generation. In some embodiments, a given connection goes through a worst-case number of cascaded frequency-conversions of $O(\log_b(FW))$. For these designs, the converter requirements are between O(F) and $O(F \log_b FW))$, per stage and per plane. The method also extends to multicast networks with b×b multicast space-switches.

According to some embodiments of the invention, there is provided wave-mixing cross-connects with higher order multi-log topologies, which comprise of many stages and planes of b×b space-switches, where $b \geq 2$. Throughout, W denotes the number of wavelengths per fiber, and F the number of fibers. In the networks of some embodiments, wavelength-conversions occur between stages. The conversions may be wavelength-selective and are implemented by one or more difference frequency conversions with pump frequencies of the form $2f_0+(W-1)\Delta f+tb^k\Delta f$, where $0 \leq k \leq (\log_b W-1)$, $-(b-1) \leq 1 \leq (b-1)$, $f_0$ is the base frequency, and $\Delta f$ is the frequency spacing.

In some embodiments, the required number of wave-mixing converters per plane and per stage is between O(F) and $O(F \log_b(FW))$, and the worst-case number of cascaded conversions can be reduced to $O(\log_b(FW))$. Additional benefits may be obtained in configurations where the number of fibers F and the number of wavelengths have the same order of magnitude (i.e., F=O(W)). In these embodiments a choice of b=F leads to a worst-case number of cascaded frequency-conversions of O(1), and wave-mixing converter requirements of O(F) for the whole cross-connect (including all the stages and all the planes). In some embodiments, networks also support multicast connections, for example, if the b×b space-switches have multicast capability.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for converting wavelength-channels in a network having a b×b space switch and a difference-frequency converter, the method comprising:

selectively directing an incoming wavelength channel through the b×b space switch to the difference-frequency converter and converting the frequency of the incoming wavelength channel by pumping with a pump frequency of the form $2f_0+\{(W-1)\pm db^i\}\Delta f$, wherein d=0, 1, ..., b-1, $f_0$ is a base frequency, W is the number of wavelengths, $\Delta f$ is a frequency spacing between adjacent channels, and i=0, 1, ... $\log_b$ W-1.

2. A method for selectively frequency translating channels in a system having W frequencies and one or more b×b space switching elements, the method comprising:

selectively directing an incoming channel operating at a respective one of the W frequencies and incoming in an incoming frequency order, based at least in part upon the respective frequency of the channel;

shifting the respective frequency of the selectively directed incoming channel by an amount defined by $\pm db^i\Delta f$, wherein $d=0, 1, \ldots, b-1$, $\Delta f$ is a frequency spacing between adjacent channels, and $i=0, 1, \ldots \log_b W-1$; and converting the incoming frequency order to an outgoing frequency order such that outgoing frequency order is the inverse of the incoming frequency order.

3. The method as defined in claim 2, wherein the incoming channel is a first channel and the selectively directed incoming channel is a first selectively directed channel, further comprising the step of:

selectively directing a second channel operating at another respective one of the W frequencies based at least in part upon the respective frequency of the second channel, wherein the respective frequency of the second selectively directed channel is the same as the respective frequency of the first selectively directed channel after it has been shifted.

4. A method for wave-mixing bulk frequency conversion in a network, wherein the network comprises one or more stages and one or more b×b switching elements connecting a number, F, of the incoming and outgoing waveguides and, wherein the incoming and outgoing frequencies correspond to a number of wavelengths W, the method comprising:

selectively directing an incoming channel operating at a respective frequency $f_i$ of the incoming frequencies and incoming on a respective waveguide $x_j$ of the incoming waveguides to a respective outgoing waveguide $x_{j-d(b^s_{-1})}$ of the outgoing waveguides; and, converting the respective frequency $f_i$ to a respective outgoing frequency $(f_0+f_{W-1})-f_i$, of the outgoing frequencies, wherein s is an index of a stage of the one or more stages, $i=0, \ldots, W-1$, $j=0, \ldots, F-1$, and $d=z_s-z_0$, where $z_{\phi-1} \ldots z_0$ is the b-ary representation of j and $\phi=\log_b F$.

5. A method for wave-mixing bulk frequency conversion in a network, wherein the network comprises one or more stages and one or more b×b switching elements connecting a number, F, of the incoming and outgoing waveguides and, wherein the incoming and outgoing frequencies correspond to a number of wavelengths W, the method comprising:

selectively directing a respective one of the incoming channels operating at a respective frequency $f_i$ of the incoming frequencies and incoming on a respective waveguide $x_j$ of the incoming waveguides to a respective outgoing waveguide $x_{j+d}$ of the outgoing waveguides; and, converting the respective frequency $f_i$ to a respective outgoing frequency $(f_0+f_{W-1}+db^{s-\phi}\Delta f)-f_i$, of the outgoing frequencies, wherein s is an index of a stage of the one or more stages, $i=0, \ldots, W-1$, $j=0, \ldots, F-1$, and $d=z_s-z_0$, where $z_{\phi-1} \ldots z_0$ is the b-ary representation of j, $\phi=\log_b F$ and $\Delta f$ is a frequency spacing.

6. An apparatus for converting wavelength-channels in a network having a b×b space switch and a difference-frequency converter, the apparatus comprising:

a b×b space switch that selectively directs an incoming wavelength channel to a difference-frequency converter that converts the frequency of the incoming wavelength channel by pumping with a pump frequency of the form $2f_0+\{(W-1)\pm db^i\}\Delta f$, wherein $d=0, 1, \ldots, b-1$, $f_0$ is a base frequency, W is the number of wavelengths, $\Delta f$ is a frequency spacing between adjacent channels, and $i=0, 1, \ldots \log_b W-1$.

7. An apparatus for selectively frequency translating channels in a system having W frequencies and one or more b×b space switching elements, the apparatus comprising:

one or more b×b space switching elements that selectively direct an incoming channel operating at a respective one of the W frequencies and incoming in an incoming frequency order, based at least in part upon the respective frequency of the channel;

a frequency shifting device that shifts the respective frequency of the selectively directed incoming channel by an amount defined by $\pm db^i\Delta f$, wherein $d=0, 1, \ldots, b-1$, $\Delta f$ is a frequency spacing between adjacent channels, and $i=0, 1, \ldots \log_b W-1$; and a frequency order converter that converts the incoming frequency order to an outgoing frequency order such that outgoing frequency order is the inverse of the incoming frequency order.

8. The apparatus as defined in claim 7, wherein the incoming channel is a first channel and the selectively directed incoming channel is a first selectively directed channel, wherein the one or more b×b space switching elements also selectively directs a second channel operating at another respective one of the W frequencies based at least in part upon the respective frequency of the second channel, wherein the respective frequency of the second selectively directed channel is the same as the respective frequency of the first selectively directed channel after it has been shifted.

9. An apparatus for wave-mixing bulk frequency conversion in a network, wherein the network comprises one or more stages and one or more b×b switching elements connecting a number, F, of the incoming and outgoing waveguides and, wherein the incoming and outgoing frequencies correspond to a number of wavelengths W, the apparatus comprising:

one or more b×b switching elements that selectively direct an incoming channel operating at a respective frequency $f_i$ of the incoming frequencies and incoming on a respective waveguide $x_j$ of the incoming waveguides to a respective outgoing waveguide $x_{j-d(b^s-1)}$ of the outgoing waveguides; and, a frequency converter that converts the respective frequency $f_i$ to a respective outgoing frequency $(f_0=f_{W-1})-f_i$, of the outgoing frequencies, wherein s is an index of a stage of the one or more stages, $i=0, \ldots, W-1$, $j=0, \ldots, F-1$, and $d=z_s-z_0$, where $z_{\phi-1} \ldots z_0$ is the b-ary representation of j and $\phi=\log_b F$.

10. An apparatus for wave-mixing bulk frequency conversion in a network, wherein the network comprises one ore more stages and one or more b×b switching elements connecting a number, F, of the incoming and outgoing waveguides and, wherein the incoming and outgoing frequencies correspond to a number of wavelengths W, he apparatus comprising:

one or more b×b switching elements that selectively direct a respective one of the incoming channels operating at a respective frequency $f_i$ of the incoming frequencies and incoming on a respective waveguide $x_j$ of the incoming waveguides to a respective outgoing waveguide $x_{j+d}$ of the outgoing waveguides; and, a frequency converter that converts the respective frequency $f_i$ to a respective outgoing frequency $(f_0+f_{W-1}+db^{s-\phi}\Delta f)-f_i$, of the outgoing frequencies, wherein s is an index of a stage of the one or more stages, $i=0, \ldots, W-1$, $j=0, \ldots, F-1$, and $d=z_s-z_0$, where $z_{\phi-1} \ldots z_0$ is the b-ary representation of j, $\phi=\log_b F$ and $\Delta f$ is a frequency spacing.

* * * * *